(12) United States Patent  
Anderson et al.

(10) Patent No.: US 7,201,954 B2
(45) Date of Patent: *Apr. 10, 2007

(54) METHOD FOR FORMING BARRIER STRUCTURES ON A SUBSTRATE AND THE RESULTING ARTICLE

(75) Inventors: Paul R. Anderson, Waterville, OH (US); Charles J. Barnhart, Toledo, OH (US); Randall J. Cutcher, Toledo, OH (US); Jill M. Wyse, Archbold, OH (US)

(73) Assignee: E. I. Du Pont de Nemours and Company, Wilmington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/300,191

(22) Filed: Nov. 20, 2002

(65) Prior Publication Data

US 2003/0068471 A1 Apr. 10, 2003

Related U.S. Application Data

(62) Division of application No. 09/596,381, filed on Jun. 16, 2000, now Pat. No. 6,544,090.

(51) Int. Cl.
*B32B 3/00* (2006.01)
*H01J 17/49* (2006.01)

(52) U.S. Cl. ............... 428/172; 428/167; 428/312.6; 428/314.8; 313/587

(58) Field of Classification Search ............ 65/20, 65/22; 428/167, 172, 188, 312.6, 314.8; 313/584, 587
See application file for complete search history.

(56) References Cited

U.S. PATENT DOCUMENTS

| | | | | | |
|---|---|---|---|---|---|
| 4,879,159 | A | * | 11/1989 | Furuuchi | ............... 428/161 |
| 5,069,960 | A | * | 12/1991 | Fukumoto et al. | ....... 428/310.5 |
| 5,310,594 | A | * | 5/1994 | Holland et al. | ............ 428/167 |
| 5,492,234 | A | | 2/1996 | Fox, III | |
| 5,909,083 | A | | 6/1999 | Asano et al. | |
| 6,247,986 | B1 | * | 6/2001 | Chiu et al. | ............... 445/24 |
| 6,544,090 | B1 | * | 4/2003 | Anderson et al. | ............ 445/24 |

OTHER PUBLICATIONS

J. W. Lee, J. H. Hong, S. J. Im, W. T. Lee, K. Y Kim & J. M. Kim, P-19 New Barrier Rib Formation Technology by Electrophoresis, Samsung Advanced Institute of Technology, Suwon, Korea, SID-00 Digest, pp. 599-60I (Mar. 2000).

(Continued)

*Primary Examiner*—Donald J. Loney

(57) ABSTRACT

A method for chemically etching of a foam glass layer to provide at least one cavity pattern in the foam glass layer. The method utilizes a substrate with at least one major surface suitable for receiving a glass layer. At least one layer of a glass paste composition in then applied onto the major surface of the substrate. The substrate and glass paste composition are then heated to a temperature sufficient enough to obtain a foam glass layer bonded to the major surface of the substrate. At least a portion of the foam glass layer is chemically etched to obtain at least one cavity pattern in the foam glass layer. The chemical etching of the foam glass layer results in an anisotropic etching rate.

3 Claims, 4 Drawing Sheets

OTHER PUBLICATIONS

S. Kanda, K. Mitzutani & T. Sone, Fabrication of Fine Barrier Ribs for Color Panels by Sandblasting, Fuji Manufactory Co., Ltd., Tokyo, Japan IDW '96, pp. 263-266 (1996).

Nicholas C. Andreadakis; 9.4: High Phosphor Excitation Efficiency in Single Substrate Color Plasma Displays: SID 88 DIGEST: pp. 153-156 (1988).

P. E. Knauer, R. D. Cleven, M. J. Brownfield, C. B. Bowser, P. R. Norby & J. A. Davis; 7.1: New Structure and Phosphor System for Color AC Plasma Displays; SID 87 DIGEST; pp. 84-87 (1987).

E. B. Shand; Glass Engineering Handbook; Special Glasses and Their Applications; Cellular Glass, pp. 356-359 (1958 Second Edition).

\* cited by examiner

METHOD FOR FORMING BARRIER STRUCTURES ON A SUBSTRATE AND THE RESULTING ARTICLE

RELATED APPLICATIONS

This application is a division of U.S. patent application Ser. No. 09/596,381, filed Jun. 16, 2000, now U.S. Pat. No. 6,544,090.

BACKGROUND OF THE INVENTION

1. Field of the Invention

The present invention relates to a method for forming cavity patterns (a series of hollowed out spaces) in a glass layer. More particularly, the present invention relates to a method involving chemically etching a foam glass layer applied to a substrate to form cavity patterns in the foam glass layer. Most particularly, the present invention relates to a method which results in anisotropic etching of a foam glass layer to form cavity patterns therein. The present invention also relates to articles having cavity patterns formed in the foam glass layer through the utilization of the chemical etching process.

2. Background of the Invention

Glass layers are often coated onto various substrates and subsequently patterned, using various techniques, to provide functional or aesthetic patterns in the glass. An example of patterned glass layers is the use of channeled glass material as a barrier rib on plasma display panels.

Plasma display panels are often utilized as video display panels for devices such as televisions and monitors. The construction of plasma display panels includes generally sheet-like front and back glass substrates having inner surfaces that oppose each other with a chemically stable gas hermetically contained between the panels by a seal. The seal is positioned between the substrates at the periphery of the panel. Elongated electrodes covered by a dielectric layer are provided on both substrates, with the electrodes on the front glass substrate extending transversely to the electrodes on the back glass substrate. The electrodes define gas discharge cells or pixels that can be selectively energized by an electric driver of the plasma display panel.

The panels are generally provided with phosphors to enhance the luminescence and, thus, the efficiency of energizing the panels. The phosphors can also be arranged in pixels having at least three subpixels or gas discharge cells for respectively emitting the primary colors to provide a full color plasma display.

The conventional construction of back glass substrates for plasma display panels has elongated gas discharge cavities or troughs, and corresponding barrier ribs that separate the troughs from each other. The spaced apart troughs form isolated columns of pixels.

Each column of pixels is thereby isolated from the column on either side of the trough. The isolation of the columns of pixels provides good color separation and pixel definition. Other construction geometries employing more complex cavity patterns than channels have also been used, such as waffle patterns, diamond patterns, egg crate or honeycomb patterns, etc. All of the various patterns in totality shall henceforth be referred to as the cavity patterns; and all contain some type of walled structure, generally along the sides or perimeter of the cavity, that shall henceforth be referred to as the barrier rib.

There are several methods utilized to form the gas discharge cavity pattern and barrier rib construction in the glass layer. The barrier ribs are generally formed through either some type of direct printing or pressing process, or the casting or transferring of a full layer, followed by the removal of a portion of the layer to create the rib structure. In the latter, the removal of a portion of the layer to create a cavity pattern is accomplished by one of several practices including development of the unwanted material if the full layer contains a photosensitive component.

In the case of direct printing by a screen printing technique, a dielectric paste is printed between electrodes to form the barrier rib structure. The paste is printed between the electrodes using a screen pattern. One or more glass compositions and one or more firing cycles may be used to build the barrier rib to a desired height, and thus form a cavity pattern of a desired depth. This method can create quality issues as a result of alignment of the pattern in multiple printings. The printing technique is also difficult to apply to large areas, and can result in resolution limitations.

Another approach in forming gas discharge barrier ribs is to photolithographically form a resist layer on the prefired frit surface, in which the areas to be removed are exposed. The exposed areas are subsequently sandblasted to abrasively remove the glass frit and provide the barrier structure. Typically, an initial dielectric layer is applied over the electrode pattern prior to application of the glass barrier material. The initial dielectric layer is cured at a higher temperature than the barrier rib firing (or sintering) temperature and is applied to protect the electrodes during sandblasting. The glass barrier layer is applied by a suitable process such as screen printing and partially fired to provide the strength needed for the subsequent processing. A resist mask is then formed to both protect and expose those regions of the partially fired barrier material. The layer is subsequently sandblasted to form the barrier structure. The barrier ribs formed by the sandblasting are then fired at high temperature to sinter the glass particles comprising the barrier rib. The sandblasting process is dirty and expensive.

The barrier rib structure may also be created in the glass layer by chemically etching a vitreous glass layer using conventional photolithographic techniques to form a photoresist mask similar to that utilized in the sandblasting method. The exposed areas are then etched to create the cavity pattern and barrier ribs. One of the limitations of the conventional etching process is the effective isotropic nature of the etching, i.e. that the lateral etch rate is equal to the vertical etch rate. This limits the ability to form deep cavity patterns at high resolutions.

It would be an advantage to provide a method for creating deep cavity patterns in a glass barrier layer that utilizes effective anisotropic etching of the glass barrier layer. It would also be an advantage to provide a method for creating barrier ribs that does not adversely affect the substrate or require a separate dielectric layer to protect the electrodes.

SUMMARY OF THE INVENTION

The present inventive method involves the chemical etching of a foam glass layer to provide at least one cavity pattern in the foam glass layer. The etching of a foam layer results in an anisotropic etch rate. An anisotropic etch rate indicates that the etching in the vertical direction occurs at a rate that is greater than the etching rate in the horizontal or lateral direction.

The method of forming cavity patterns in a foam glass layer includes providing a substrate with at least one major surface suitable for receiving a glass layer. At least one layer of a glass paste composition is then applied onto the major surface of the substrate. The substrate and glass paste composition are then heated in at least one firing cycle to a temperature sufficient enough to obtain a foam glass layer bonded to the major surface of the substrate. At least a portion of the foam glass layer is chemically etched to obtain at least one rib pattern in the foam glass layer.

In a preferred embodiment, the substrate is a glass substrate, and the foam glass layer is etched to provide barrier ribs that define gas discharge troughs in a plasma display panel. The etched cavity pattern can be simple straight channels or more complex geometric patterns such as waffle patterns, diamond patterns, egg crate or honeycomb patterns, etc. Cavity patterns are defined by and separated from each other by barrier rib structures having various possible cross-section profiles or shapes, such as modified I-beams or trapezoids. Electrodes are first deposited onto the glass substrate followed by application of a uniform glass dielectric which is fired prior to application of the foam barrier glass paste composition. After formation of the foam glass layer, channels are etched into the foam glass layer in a pattern defined by a photoresist. The channels are etched in the foam glass layer at locations that correspond to the position of the electrodes.

The resulting article is suitable for use as a back substrate in a plasma display panel in a preferred embodiment, but could be used as a front substrate in certain plasma display designs. Phosphors are then placed in the channels to enhance the luminescence from the gas discharge when the electrodes are activated. Phosphors may not be necessary if a monochrome display is desired.

BRIEF DESCRIPTION OF THE DRAWINGS

The above, as well as other advantages of the present invention, will become readily apparent to those skilled in the art from the following detailed description when considered in the light of the accompanying drawings, in which.

DETAILED DESCRIPTION

Figure 1:
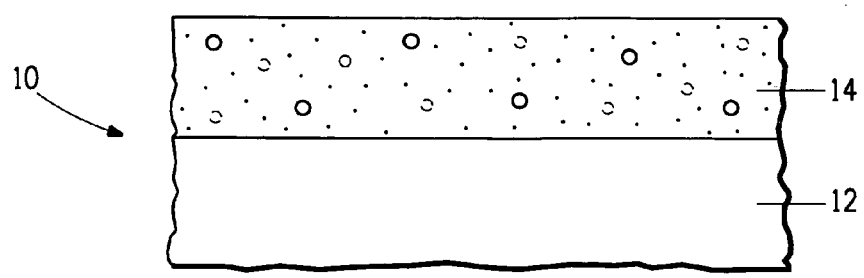
FIG. 1 is a fragmentary, elevational, view of an article according to the method of the present invention.

The present invention involves a method for chemically etching a foam glass layer, as well as articles formed by the use of the method. It has been discovered that a foam glass layer etches anisotropically. For purposes of the present invention, anisotropic etching indicates that the etching rate is greater in the vertical direction than in the horizontal direction. Preferably, the etching rate in the vertical direction is about two times or more than the etching rate in the horizontal direction. The difference in the etching rate between the vertical and horizontal directions results in cavity patterns in the foam glass layer that are deeper than would normally be expected with vitreous, or fined, glass layers.

Plasma display panels, as well as other flat panel displays, for example, field emissive displays (FEDs), utilize ribbed patterns on a surface of a glass substrate as part of the sub-pixel cell structure. The side walls of the patterned structure function as the barrier ribs. A plurality of corresponding cavity patterns are used to create isolated columns and or rows of sub-pixels or cells which are separated from one another by the barrier ribs. The present invention provides an improved process for forming barrier ribs in plasma display panels.

In accordance with the present invention, any substrate capable of bonding to a foam glass layer is suitable for use with the inventive method. The substrate should be able to withstand the firing temperature of a glass paste composition used in forming the foam glass layer. Suitable substrates would include, for example, materials selected from glass, metal, polymer and ceramic. An important use of the inventive method is the use of a glass substrate to form plasma display panels. Glass substrates produced from conventional float glass manufacturing processes are one example of suitable glass substrates for purposes of the present invention.

The substrate must be compatible with the composition of the foam glass layer. The thermal expansion coefficient of the substrate should be suitably matched to the thermal expansion coefficient of the foam glass layer in order to avoid development of objectionable stress during the cooling of the foam glass layer after firing, which may result in cracking or fracturing between, or in, the foam glass and the substrate at some later time. Additionally, the softening point of the substrate should be higher than the softening point of the foam glass material. The formation of the foam glass layer occurs at elevated temperatures. Therefore, the substrate should be capable of withstanding these temperatures without deforming.

The use of the present inventive method with plasma display panels includes the use of electrodes bonded to a surface of the substrate. Conventional electrodes utilized by those skilled in the art, of producing plasma display panels are suitable for use with the inventive method. The electrodes may consist of a single layer of conductive material such as, for example, silver, gold, copper, aluminum or other conductive metals or metal alloys.

Alternatively, the conductive materials may be applied in multiple, or stacked layers such as the combination of chrome, copper, and chrome. The electrode is generally applied onto the substrate using conventional application practices. For example, the electrode may be applied by screen printing, by sputtering, physical or chemical vapor deposition and associated patterning processing. The electrodes are generally applied as line patterns or area coatings that may extend to one or both edges of the substrate. Each electrode may correspond to a desired cavity location in the patterned foam glass layer. The electrode is preferably centered in the cavity or channel region that borders the barrier rib pattern. It should be understood that, depending on the application, all or part of the electrode may or may not be centered in the cavity or channel, and all or part of the electrode may extend to one or both sides of the finished cavity or channel.

Optionally, a dielectric layer, apart from the foam glass layer, may be applied over the substrate and any electrodes bonded to the substrate. Dielectric layers have often been applied as protective barriers for the electrode to prevent the degradation of the electrode during formation of cavity patterns by sandblasting. The present cavity pattern forming method should not adversely affect the electrodes. However, the optional dielectric layer may be useful for device operational considerations. Conventional dielectric materials may be utilized for this purpose. However, the dielectric materials selected should be impervious to the chemical etching solution. The dielectric layer may be applied by conventional application practices generally recognized by those skilled in the art. Any glass composition meeting the expansion coefficient requirements, that has a softening point between the substrate and foam glass softening points and that is reasonably inert to the foam glass etchant can be used.

The foam glass of the present invention is provided as a layer onto the substrate. The foam glass layer is first applied as a paste composition and then heated at elevated temperatures, typically, for plasma display panels, in the range of 500 to 560° C., to create the foam glass layer. This temperature range is below the temperature of 580–600° C., typically used in the prior art to fire fined glass layers.

For purposes of the invention, a foam glass is a glass shaving a portion of its volume comprised of closed cell bubbles. The level or amount of bubbles present in the foam glass is an amount sufficient to provide an anisotropic etch rate.

The paste material generally includes glass particles (frit) and a binder system. The frit and the binder system are included in a vehicle to form the paste. Any glass composition suitable for making a vitreous glass is suitable for use with the present inventive method. A glass composition conventionally utilized in forming vitreous glass layers on plasma display panels includes about 74% by weight PbO, about 13% by weight $SiO_2$, and about 13% by weight $B_2O_3$. This same composition would also be useful in forming the foam glass layer of the present invention.

Another frit which hap proved satisfactory is a frit comprising, a glass composition by weight of approximately 80.5% PbO, 6% $SiO_2$, 12% $B_2O_3$, 0.9% $Na_2O$ and 0.6% $Al_2O_3$. A third frit which may be used has a composition by weight of approximately 73.4% PbO, 15.5% $SiO_2$, 9.6% $B_2O_3$, 0.9% $Na_2O$ and 0.6% $Al_2O_3$.

Mediums which may be mixed with the frit, and other ingredients to be discussed hereinafter, may have a composition comprising approximately 10.0% by weight of Ethylcellulose N-22 manufactured by Hercules, Incorporated, of Wilmington, Del., and approximately 90.0% by weight of Terpineol (mixed isomers), or 8.0% by weight of Ethylcellulose N-22 and 92.0% by weight of 2,2,4-Trimethyl-1,3-pentandiol monoisobutyrate. The mediums are prepared by heating the solvent to approximately 100° C., adding the ethylcellulose, stirring until the polymer is completely dissolved, cooling the medium to room temperature, and storing in a closed container.

It can be seen that other frits and mediums may be used, depending on the application. For example, a medium comprised of 15% by weight of an acrylic ester resin (B67) manufactured by Rohm and Haas, and 85% by weight of a proprietary vehicle called Texanol, manufactured by Eastman Chemical, is satisfactory. Another medium that can be used is comprised of a two-part vehicle containing 75% by weight Pine oil and 10% by weight glycol ether and 14% by weight of an acrylic resin binder and less than 1% by weight of a surfactant.

The binder generally holds the glass particles together, and to the substrate, prior to the heating of the glass. A significant portion of the binder composition is driven off during the heating of the glass particles.

The present invention requires that the paste is heated at temperatures that are sufficient to soften the glass frit. In conventional glass layer formation processes, the sequence of processing steps first requires softening of the glass particles. The molten glass is then fined to remove all bubbles resulting from entrapped air and pyrolysis products. The fining process is directly affected by the time and temperature conditions as related to the viscosity of the glass. Upon completion of the fining step, the molten glass forms a substantially level surface before subsequently cooling and annealing to form the finished glass layer.

The present method does not completely fine the glass melt and leaves a sufficient amount of closed cell bubbles present in the glass layer in order to beneficially affect the etching process. The foam glass layer has a sufficient amount of bubbles to provide an anisotropic etching rate. Preferably, the foam glass layer contains about 10% to about 60% bubbles by volume. Most preferably, the foam glass layer contains about 20% to about 50% bubbles by volume. The percent by volume of the closed cell bubbles may be determined by the difference in thickness between a fixed weight of a predetermined paste composition applied to a fixed area of substrate and fired until a fully fined layer is formed, and the same weight of the same composition applied to the same area of the same type substrate and partially fired to the desired foam level. For example, if the fully fined layer was 100 microns thick, and the partially fired layer was 120 microns thick, the change in thickness would be 20 microns, or $20/100=20\%$. Since the change in thickness is substantially due to the formation of bubbles in the partially fired (foam) glass layer, a change in thickness of 20% results in 17% ($20/120$) bubbles by volume.

The particle size and particle size distribution of the glass used in the paste has been found to be important to foam formation. Experimental work has been carried out investigating the foam forming characteristics of two different grinds of IX2435 glass obtained from Ferro Corporation of Cleveland, Ohio, and are described as follows. It should be noted that $D_{10}$, $D_{50}$, and $D_{90}$ mean that 10, 50 and 90% by volume of the sample measured has particle sizes at or less than the cited value, i.e., in the first case below, 10% of the standard grind sample has a particle size less than or equal to 3.4μ, while 90% of the sample had particle sizes of 35.3μ or less.

| | |
|---|---|
| Standard grind (Std) particle size (one lot #2371) | $D_{10}$ - 3.4μ |
| | $D_{50}$ - 14.8μ |
| | $D_{90}$ - 35.3μ |
| SRRG grind particle size (one lot #3179) | $D_{10}$ - 0.5μ |
| | $D_{50}$ - 2.3μ |
| | $D_{90}$ - 5.2μ |

The particle size distribution data for the two grinds were obtained from Ferro Corporation.

Pastes were made from each of these glass powder grinds using a Ferro C-218, vehicle/binder system. This material is about 20% n-butyl methacrylate, less than about 1% wetting agent and the balance pine oil. Parts were printed with these pastes and fired at a series of peak plateau temperatures from 500° C. to 560° C. (zones 10–12) in a 21 zone BTU lehr set-up to give a 3 hour total cycle time (load to unload). These firing cycles also had a two zone (5 & 6) plateau at 400° C. for binder burn-out. The following table shows the data and results from this experiment.

TABLE I

Foam character as a function of temperature for two Ix 2435 glass frit particle sizes.

| Grind (Mfg. ID) | Part No. | Fired Wt. (gms) | Fire Plateau ° C. | Foam Thk, μ | Full Fired Thk, μ(calc) | % Foam |
|---|---|---|---|---|---|---|
| SRRG | 2104 | 14.4 | 500 | 121.0 | 107.0 | 13.1 |
|  | 2314 | 14.3 | 510 | 141.0 | 106.5 | 32.4 |
|  | 2110 | 14.5 | 520 | 158.0 | 107.5 | 47.0 |
|  | 2106 | 14.4 | 530 | 197.0 | 107.0 | 84.1 |
|  | 2310 | 14.3 | 540 | 219.0 | 106.5 | 105.6 |
|  | 2278 | 14.2 | 550 | 177.0 | 106.0 | 67.0 |
|  | 2276 | 14.2 | 560 | 158.0 | 106.0 | 49.1 |
| Std | 2280 | 14.4 | 500 | 114.0 | 111.0 | 2.7 |
|  | 2308 | 14.4 | 510 | 117.0 | 111.0 | 5.4 |
|  | 2284 | 14.5 | 520 | 124.0 | 112.0 | 10.7 |
|  | 2288 | 14.5 | 530 | 119.0 | 112.0 | 6.3 |
|  | 2294 | 14.8 | 540 | 124.0 | 114.0 | 8.8 |
|  | 2286 | 14.1 | 550 | 124.0 | 109.0 | 13.8 |
|  | 2302 | 15.1 | 560 | 141.0 | 116.0 | 21.6 |

The percent of foam formation is shown for the two particle size grinds as a function of peak plateau temperature in an otherwise identical three hour load to unload BTU cycle. Clearly, the smaller particle size powder, SRRG, gave the best and consistent foaming action in the temperature range evaluated in this study.

The particle size and particle size distribution of the glass frit utilized in the paste can affect the amount and size of bubbles in the resulting foam glass layer. Those skilled in the art of providing glass barrier layers are capable of determining particle size and particle size distributions for selected glass compositions to obtain foam glass barrier layers with a desirable level of foam. In general, smaller particle sizes tend to provide better foaming results than larger particle sizes. Smaller size bubbles in the foam glass layer are preferred. The smaller size bubbles do not adversely affect the character of the barrier ribs by creating large voids on the-exposed side walls of the cavity pattern.

The method of the present invention involves chemically etching the foam glass layer to create at least one barrier rib pattern in the foam glass layer. Under the directed force of a spray etchant, the foam glass layer etches anisotropically, indicating a greater etching rate in the vertical direction than in the horizontal direction. The presence of bubbles in the foam glass layer coupled with a spray etchant solution directed substantially at the foam glass layer surface, provides the difference between the vertical etch rate and the horizontal etch rate. For purposes of the invention, cavity patterns are defined as grooves, channels, or other patterns such as waffle patterns, diamond patterns, egg crate or honeycomb patterns, etc., that extend from an outer surface or side wall of the foam glass layer into the foam glass and create a cavity or hollow when etched. The cavity patterns that are created may have various cross-sectional shapes and dimensions depending upon the top layer protective photoresist pattern, etching solution, the composition of the foam glass layer, and the application techniques utilized in applying the etching solution.

In a preferred embodiment, the method for forming cavity patterns in a foam glass layer includes providing a substrate with at least one major surface suitable for receiving a foam glass layer. At least one layer of a glass paste composition is then applied onto the surface of the substrate. The substrate and the dried glass paste layer are then heated to a temperature sufficient enough to obtain a foam glass layer bonded to the substrate. FIG. 1 depicts an article 10 having a substrate 12 and a foam glass layer 14 resulting from the heating of a glass paste composition. The foam glass layer 14 is then chemically etched to form at least one cavity pattern or channel (not shown) in the foam glass layer 14.

Figure 2:
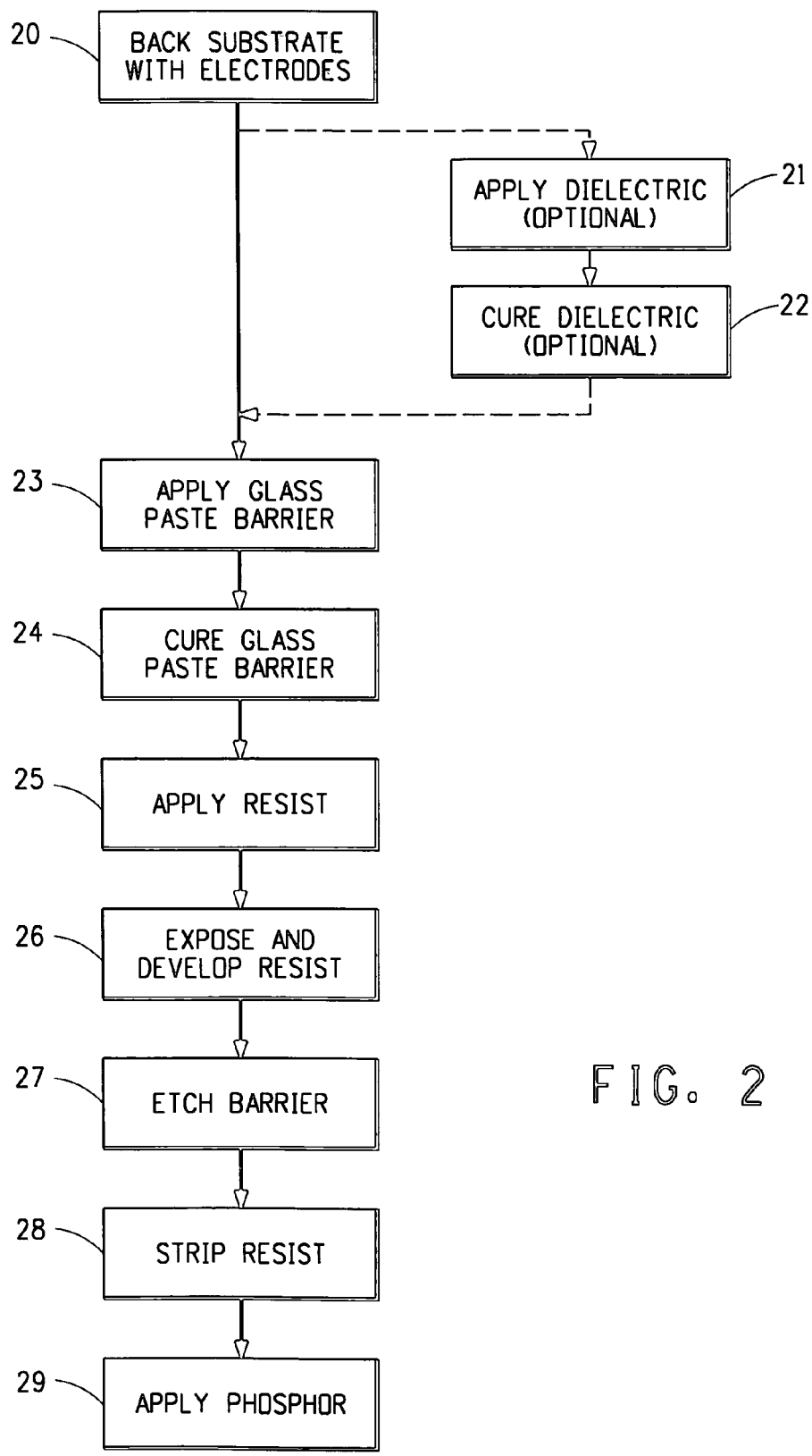
FIG. 2 is a process flow diagram showing the steps of the inventive method.

In a most preferred embodiment, the practice of the present inventive method is directed to the formation of cavity patterns or channels on a glass substrate for use in plasma display panels. FIG. 2 illustrates the process for forming the barrier ribs of plasma display panels. In the first step 20, a glass substrate is provided with electrodes bonded to a surface of the substrate. The substrate and the electrodes may optionally be coated with a dielectric layer (step 21), and subsequently cured in step 22.

In step 23, a glass paste barrier layer is then applied over the electrodes and substrate, and over the dielectric layer, if present. The glass paste is then heated, or cured, to an elevated temperature to form a foam glass layer (Step 24). A photoresist is then applied (Step 25), and then exposed and developed (Step 26) to provide a pattern for the desired gas discharge cavity and the corresponding barrier ribs. An etching solution is then applied (Step 27) onto the foam glass to form the desired cavity patterns. The photoresist is then stripped (Step 28). Finally, phosphors are coated onto the surface of the cavity pattern, between the barrier ribs, and over the electrodes 29.

The method of the present invention requires the application of a glass paste onto a surface of the substrate, and over the electrodes positioned on the substrate. The glass paste composition may be applied through conventional application methods. For example, the paste can be applied by printing, transferring, or spreading the glass paste composition onto the substrate. The printing procedures are similar to procedures presently utilized by those skilled in the art of applying layers of glass paste onto substrates. The method of the present invention does not require the critical alignment of multiple layers to form the cavity patterns and barrier ribs. Therefore, the printing of the glass paste composition is easier with the present invention. Commercial printers capable of printing the glass paste are suitable for use with the present inventive method. A Thieme printer, Model 1025 from American Thieme Corp. of Teningen, Germany, is an example of one printer that can be used in printing the glass paste composition.

An additional means for applying the glass paste composition would include standard transferring techniques. For example, the paste could be applied onto tape laminating media and subsequently transferred onto the substrate. Alternatively, the glass paste may be roller coated or similarly transferred or spread onto the substrate. The application technique may vary depending upon the specific application and composition of the glass paste. Those skilled in the art are capable of determining an appropriate application technique for the glass paste composition.

The amount and thickness of paste applied onto the substrate are selected to meet processing conditions and desired end product properties. Print thickness and thickness uniformity are important parameters in providing a final foam glass barrier height and barrier uniformity. The paste is generally applied at a dried thickness of about 120μ to about 180μ for a VGA resolution 42" diagonal plasma display panel. Thicknesses within this range can yield a foam glass layer in the range of about 100μ to about 160μ depending on the level of foaming in the glass.

The paste composition, after application onto the substrate, is dried to evaporate most of the vehicle. The remaining binder composition bonds the glass particles together and to the substrate. The strength of the bond should be sufficient to allow printing of subsequent layers of glass paste and to permit handling of the coated substrate prior to firing of the glass particles. Those skilled in the art are capable of determining drying parameters and temperatures to sufficiently drive off the vehicle in the glass paste composition. In a preferred embodiment, a conveyor drier is used at a temperature of about 90° C.

The foam glass layer is formed during an elevated temperature firing cycle. The processing step generally takes place in a lehr. A lehr is defined as a pass-through type oven wherein a part to be heated can be placed on a belt, chain, rollers or walking beam, to be carried through the controlled heating and cooling zones of the oven.

The temperatures utilized to form the foam glass layer are dependent upon several factors relating to the specific article. For example, the lehr temperature can depend on the type of glass frit used in the paste composition, the dimensions of the substrate, the binder composition in the glass paste, or the thickness of the glass paste composition. Those skilled in the art are capable of determining appropriate temperature set points to obtain a foam glass layer.

The article is subjected to the lehr conditions for a period of time to permit the formation of bubbles in the glass composition without completely fining the glass. The foaming action can be controlled to obtain the desired thickness for the foam glass layer. In a preferred embodiment, the foam glass layer contains 10% to 60% bubbles by volume. The target layer height can be obtained by controlling the thickness of paste applied and the level of foaming in the glass layer. The level of foaming can be controlled by adjusting the peak lehr temperature. For a partially fired part, lower peak temperatures generally reduce the bubble size and the level of fining that takes place in the glass layer and thereby results in the desired amount of bubbles in the glass.

In most applications, lit is desirable to provide specific arrays of cavities in the foam glass layer. Conventional photolithographic techniques are suitable for defining specific patterns and arrays in the foam to prevent the chemical etching of certain areas of the foam glass. For this purpose, photoresists, in either liquid or film form, are suitable for placement onto the foam glass layer. With either liquid or film, the photoresist is applied onto the exposed surface of the foam glass layer. The photoresist is then exposed and developed under conventional practices with standard equipment. It is important that the resist creates a sharp pattern that is capable of withstanding the etchant.

The cavities and corresponding barrier ribs are formed by etching the patterned foam layer with a simple etchant material. In general, the etchant is a dilute acid such as nitric acid. However, any etching solution capable of etching a foam glass layer is suitable for use with the present invention. The etching conditions are generally controlled by, but not limited to, the adjustment of concentration of the etchant, temperature of the etchant, the speed of the article passing through the etchant spray zone, the pressure of the spray, and the orientation of the etched surface to the etchant spray. Preferred operating parameters include etchant concentrations of dilute nitric acid within the range of about 0.4% to about 2.0% in water, and etchant temperatures of up to about 50° C.

The chemical etching of the foam layer results in an anisotropic etching rate. The bubbles in the foam glass layer coupled with directed sprayed etchant enable the etching rate to proceed at a faster rate in the vertical direction than in the horizontal direction. This difference between vertical etching rates and horizontal etching rates provides improved height to width barrier rib aspect ratios. This effect is particularly desirable in plasma display panels where phosphors are applied into the cavities to enhance the luminescence of the plasma discharge. Additionally, the foam glass inherently creates a surface roughness due to the bubbles in the glass. The surface roughness enhances the ability of the phosphors to bond to the side-walls of the barrier rib structure.

Figure 3:
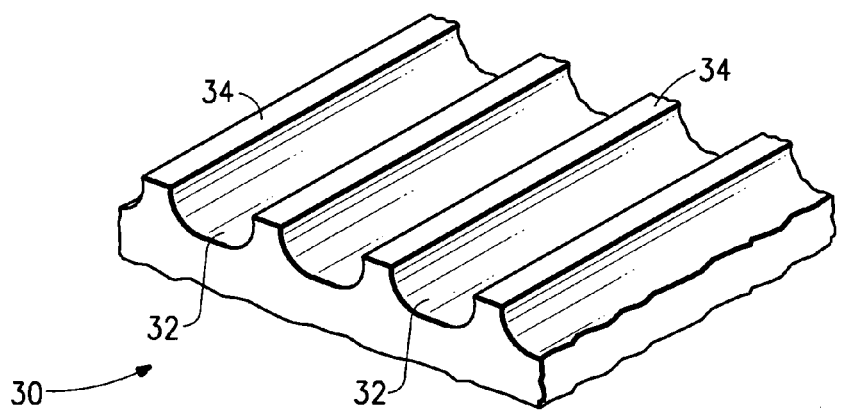
FIG. 3 is a fragmentary perspective view of a fined glass layer according to the prior art.
Figure 4:
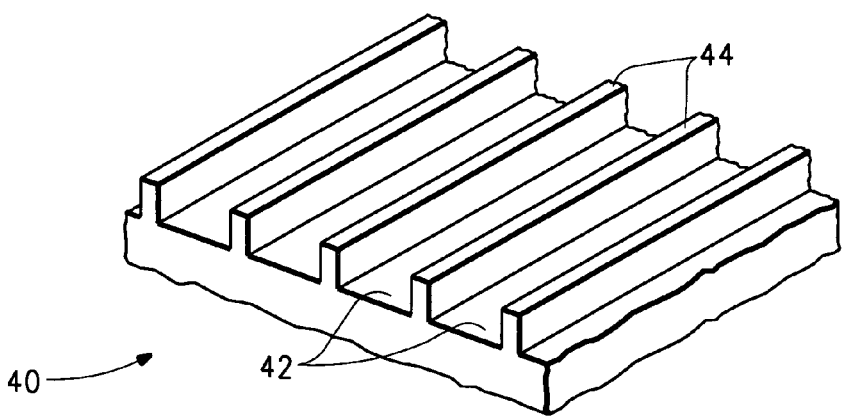
FIG. 4 is a fragmentary perspective view of a foam glass layer according to the present invention.

FIGS. 3 and 4 depict the difference in resulting channel cavities due to the use of the fined glass layer recognized in the prior art, and the foam glass layer according to the present invention. In FIG. 3, a conventional glass layer 30 produced from a fined glass has channels 32 and barrier ribs 34. The channels 32 are a result of isotropic etching of the fined glass layer 30 and are substantially semi-cylindrical in shape and semi-circular in cross-section.

FIG. 4 illustrates a foam glass layer 40 produced from the method of the present invention. The foam glass layer 40 includes channels 42 and barrier ribs 44. The formation of the channels 42 through the chemical etching of the foam glass layer results in channels 42 that are more rectangular in shape and can be deeper while maintaining this shape, than those formed by prior art etching methods.

The method of the present invention is suitable for any application where it is desirable to have either a barrier rib pattern or a cavity pattern in a glass layer. Preferably, the inventive method is used in providing cavity patterned substrates with corresponding barrier rib structures for use in plasma display panels.

Figure 5A:
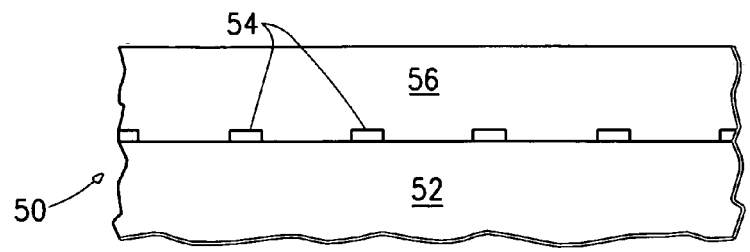
FIG. 5 A–C are fragmentary sectional views of constructions formed at different steps of the method shown in FIG. 2.
FIG. 5D is a modification of the construction shown in FIG. 5C.
Figure 5B:
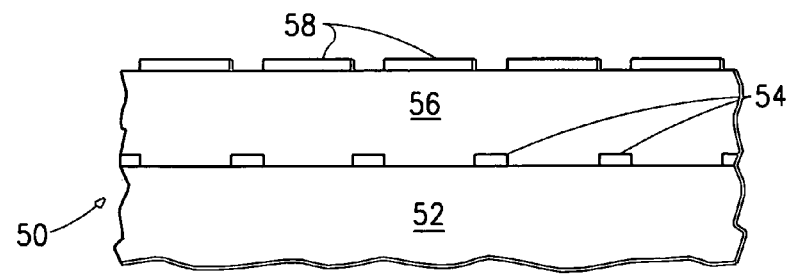
Figure 5C:
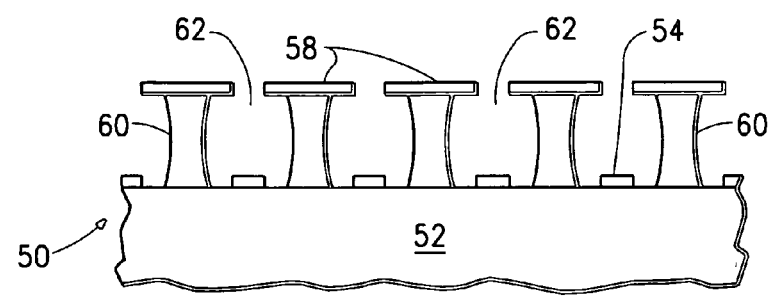
Figure 5D:
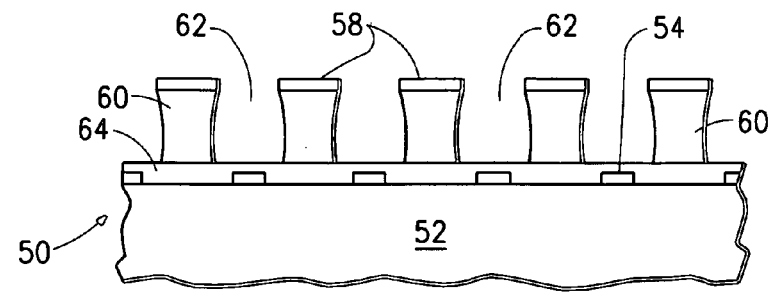

FIGS. 5A through 5C illustrate the inventive method used to produce an article 50 for plasma display panels. FIG. 5A includes a glass substrate 52 with electrodes 54 deposited onto a surface of the glass substrate 52. A foam glass layer 56 is deposited over the glass substrate 52 and electrodes 54. FIG. 5B shows the article 50 having a photoresist 58 applied onto the foam glass layer 56. FIG. 5C depicts the article 50 after the etching of the foam glass layer 56. The etching process results in the exposure of the electrodes 54 in channels 62. Barrier ribs 60 are created through the use of the photoresists 58. The barrier ribs 60 separate channels 62. FIG. 5D illustrates the use of an optional dielectric layer 64 applied on the glass substrate over the electrodes 54.

Figure 6:
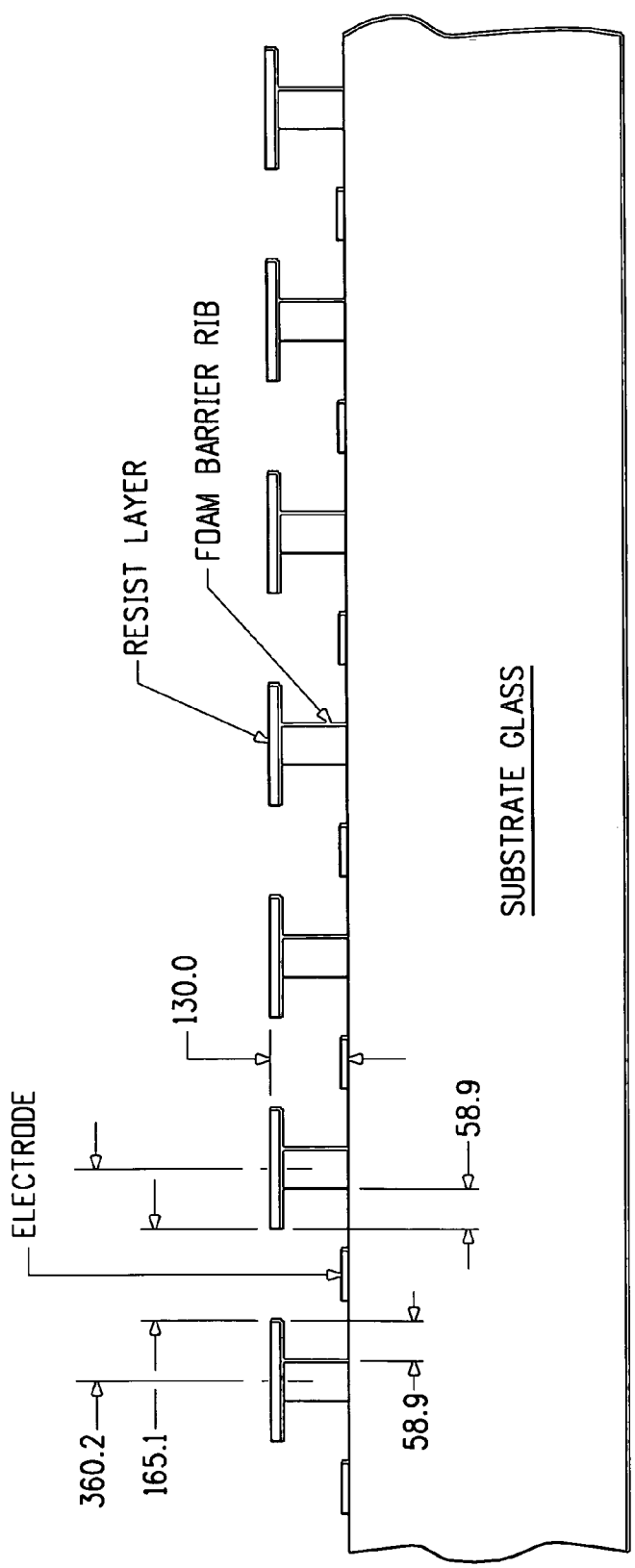
FIG. 6 is a diagrammatic elevational view which illustrates anisotropic etching.

FIG. 6 illustrates anisotropic etching of foam barrier ribs according to this invention. The direction of spray etch is substantially normal to the resist layer and underlying foam glass layer. An anisotropic etch factor of 2.2 is illustrated. Although the true anisotropy is significantly greater, the distance etched in the direction perpendicular to the foam glass layer is limited by the thickness of the foam layer. Therefore, if the foam layer thickness was greater, the distance etched in that direction would have been greater than 130μ, while the lateral etch would have remained unchanged at 59μ. Thus, the actual anisotropy would have been greater than the effective anisotropy of 2.2.

The following non-limiting examples further illustrate the present invention. The particular materials and amounts recited in these examples, as well as other conditions and details, are to be interpreted broadly in the art and should not be construed to unduly restrict or limit the invention in any way.

EXAMPLES

Example 1

The following is an example of the invention used to form barrier rib structures on the back substrate of a color AC gas discharge display panel. The rib structures may be in the shape of straight lines forming straight channels in between adjacent ribs into which phosphors are placed, or they may be more intricate shapes, nevertheless used to separate phosphors of different colors.

A commercially available soda-lime-silicate float glass, 3 mm thick, and obtained from American Float Glass, Inc. is used as the substrate glass.

A glass paste is applied, in a uniform thickness with a dried weight of 0.054 gms/cm$^2$, to the surface of the float glass substrate. This paste is comprised of a glass frit having a surface area of the order of 2.8–3.8 m$^2$/gm and a composition of 74% PbO, 13% SiO$_2$, and 13% B$_2$O$_3$, and a vehicle/binder system containing a medium made up of 1 part ethyl cellulose N-22, a product of Hercules, Inc., Wilmington, Del., and 9 parts Terpineol (mixed isomers) and a surfactant, Soya Lecithin. The glass frit is present in the paste in the order of 75% by weight, the medium, 23.5% by weight, and the Soya Lecithin in the order of 1.5% by weight. The viscosity of this paste is of the order of 145 pascal seconds.

The paste is applied to the substrate by screen printing using a Theime screen printer and a 105 mesh screen. A number of print and dry cycles are required to reach the desired thickness. The substrate with the dried paste layer was then fired in a lehr to a peak temperature of 520° C. in a 3 hour total cycle to form the foam glass. The resulting foam thickness will be the final barrier rib height.

The foam glass layer on the substrate glass is then patterned using a photolithographic process which employs a dry film resist material, Riston CM106, manufactured by E.I. DuPont de Nemours & Co., Photopolymer & Electronic Materials, Research Triangle Park, N.C. This material is laminated to the foam glass surface and subsequently exposed using a phototool that presents a negative image of the desired pattern on the foam glass surface. The resist is then sprayed with a 1% by weight solution of K$_2$CO$_3$ to develop the pattern and expose the foam glass in the areas to be etched away. The foam is etched by exposure to an aqueous 0.5% solution of nitric acid (HNO$_3$) using a spray etcher manufactured by Atotech Corp. After etching, the resist is stripped from the surface using an aqueous 3% by weight solution of KOH.

The resulting foam thickness was of the order of 130 microns. The rib width, a straight line pedestal in this case, was about 75 microns and the ribs were on 360 micron centers. An effective etch anisotropy of 2.2 was observed.

Example 2

This example is similar to Example 1, except that the paste is formulated to contain 68.5% by weight of the glass frit (the same frit as used in Example 1) instead of 75% by weight. The vehicle/binder is the same as for Example 1, except that an additional 6.5% by weight of terpineol is used to result in a paste viscosity of the order of 55 pascal seconds.

Using this paste formulation required more print and dry repeats to achieve the same dried weight of paste on the substrate. The foam results from this paste are similar to the results obtained in Example 1.

Example 3

A foam glass layer as in Example 1, except the paste is formulated using tridecyl phosphate as the surfactant instead of soya lecithin. No apparent change in the foaming or etching characteristics were apparent in the foam formed from this paste.

Example 4

A foam glass layer as in Example 1, except the glass frit composition is 80.5% PbO, 6% SiO$_2$, 12% B$_2$O$_3$, and 1.5% ZnO and having a surface area of the same order as the frit of Example 1. The foaming of this frit composition paste caused many large bubbles to occur, but with approximately the right thickness.

Example 5

A foam glass layer as in Example 1, except the glass frit composition is 73.4% PbO, 15.5% SiO$_2$, 9.6% B$_2$O$_3$, 0.9% NaO, and 0.6% Al$_2$O$_3$ and having a surface area of the same order as the frit of Example 1. The foaming of this frit composition paste caused many large bubbles to occur with approximately the right thickness.

Example 6

A foam glass layer as in Example 1, except that a second medium ingredient of 15.7% by weight used to formulate the paste replaces a portion of the original medium, which is comprised of 8 parts ethyl cellulose and 92 parts 2,2,4-trimethyl-1,3-pentandiol monoisobutyrate. The resulting foam had a smaller bubble size, with small changes in etching characteristics.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An article comprising:
   a substrate selected from glass, metal, polymer, or ceramic; and
   a foam glass layer bonded to said substrate and containing about 10% to about 60% bubbles by volume,
   wherein said foam glass layer has at least one cavity pattern, a multiplicity of cavity patterns separated by barrier ribs, or an array separated by barrier ribs; and
   wherein said substrate and said foam glass layer have thermal expansion coefficients which will avoid development of objectionable stress between the substrate and the foam glass layer during the cooling of the foam glass layer; and
   wherein said substrate includes at least one electrode applied onto said substrate between said foam glass layer and said substrate.

2. An article according to claim 1, wherein a dielectric layer is bonded to said substrate between said substrate and said glass layer.

3. An article according to claim 1, wherein said substrate includes at least one electrode applied onto said substrate and a dielectric layer bonded between said substrate and said foam glass layer.

* * * * *